United States Patent
McGlumphy et al.

(10) Patent No.: US 12,159,616 B2
(45) Date of Patent: Dec. 3, 2024

(54) ELECTRONIC HORN DEVICE AND METHOD

(71) Applicant: Transportation IP Holdings, LLC, Norwalk, CT (US)

(72) Inventors: Jonathan McGlumphy, Roanoke, VA (US); J. Hunter Babcock, Roanoke, VA (US); Jacob Grisso, Salem, VA (US); James Morrow, Roanoke, VA (US)

(73) Assignee: Transportation IP Holdings, LLC, Norwalk, CT (US)

( * ) Notice: Subject to any disclaimer, the term of this patent is extended or adjusted under 35 U.S.C. 154(b) by 386 days.

(21) Appl. No.: 17/456,047

(22) Filed: Nov. 22, 2021

(65) Prior Publication Data

US 2023/0162715 A1 May 25, 2023

(51) Int. Cl.
| | |
|---|---|
| *G10K 9/12* | (2006.01) |
| *B60Q 5/00* | (2006.01) |
| *G10K 9/04* | (2006.01) |
| *G10K 9/22* | (2006.01) |

(52) U.S. Cl.
CPC .............. *G10K 9/12* (2013.01); *B60Q 5/00* (2013.01); *G10K 9/04* (2013.01); *G10K 9/22* (2013.01)

(58) Field of Classification Search
CPC ... G10K 9/12; G10K 9/04; G10K 9/22; B60Q 5/00
USPC .......................................................... 367/140
See application file for complete search history.

(56) References Cited

U.S. PATENT DOCUMENTS

| | | | | |
|---|---|---|---|---|
| 709,798 | A * | 9/1902 | Rowe | B61L 25/065 246/123 |
| 4,882,562 | A * | 11/1989 | Andrews | H04R 1/30 181/185 |
| 7,221,113 | B1 * | 5/2007 | Young | A63H 19/24 318/9 |
| 2018/0118240 | A1 | 5/2018 | Truong et al. | |

OTHER PUBLICATIONS

49 CFR 229.129, Federal regulations concerning railroad locomotive safety standards, 2 pages (Year: 2024).*
"Train horn," Wikipedia 2020, downloaded Jan. 27, 2024 from https://en.wikipedia.org/w/index.php?title=Train_horn&oldid=992567708, 15 pages. (Year: 2020).*

* cited by examiner

*Primary Examiner* — Daniel L Murphy
(74) *Attorney, Agent, or Firm* — K&L Gates LLP

(57) ABSTRACT

An electronic horn device may include a horn module, one or more amplifiers, and a controller operably connected to the horn module via the one or more amplifiers. The horn module may be mounted onboard a vehicle. The horn module includes plural compression drivers and a horn body. The horn body includes a bell segment and plural branch segments fluidly connected to the bell segment. The compression drivers are respectively mounted to respective ends of the branch segments of the horn body. The one or more amplifiers are operably connected to the compression drivers of the horn module. The controller is configured to control the compression drivers to generate a horn sound that is emitted from the bell segment of the horn body in response to receipt of a first control signal.

20 Claims, 4 Drawing Sheets

ELECTRONIC HORN DEVICE AND METHOD

BACKGROUND

Technical Field

The subject matter described herein relates to audio output devices, and particularly to audible warning devices configured to be installed onboard vehicles.

Description of the Art

Vehicles typically utilize onboard horns to provide an audible output sound that warns pedestrians, animals, and operators of nearby vehicles about the presence of the vehicle. With respect to rail-based trains, regulations exist to control certain aspects of horn usage. For example, trains must sound the horn within a certain output sound level or range when the trains reach a certain distance from a grade crossing. In another example, the horn sound emitted from the train must be distinct from other sounds and easily identifiable to an observer as coming from a train. Horns may also be used to communicate certain information, such as to indicate receipt of a command or completion of a step during a switching operation.

At least some conventional horns are air horns that operate through the use of compressed air. Air horns can provide very loud sounds, at the cost of consuming a considerable amount of compressed air. The operation of the air horns may be affected by environmental conditions, such as temperature, which changes the properties of the air and/or the diaphragm. As a result, an air horn may not be able to satisfy certain regulations in some conditions, or may undesirably require adjustments or additional compressed air to satisfy the regulations. In addition, air horns may be limited to producing only a single sound. Some trains have multiple audio output devices onboard for providing different types of warnings, such as an air horn for horn sounds, a bell device for emitting bell sounds, and a third device for amplifying an operator's voice. Consequently, an audio output device that can reliably communicate different types of sounds (e.g., warnings) from a vehicle without consuming compressed air is desired.

Thus, a need may exist for a horn that differs from the conventional horns described above.

BRIEF DESCRIPTION

In at least one embodiment, an electronic horn device is provided that includes a horn module, one or more amplifiers, and a controller including one or more processors and operably connected to the horn module via the one or more amplifiers. The horn module is configured to be mounted onboard a vehicle. The horn module includes plural compression drivers and a horn body. The horn body includes a bell segment and plural branch segments fluidly connected to the bell segment. The compression drivers are respectively mounted to respective ends of the branch segments of the horn body. The one or more amplifiers are operably connected to the compression drivers of the horn module. The controller is configured to control the compression drivers to generate a horn sound that is emitted from the bell segment of the horn body in response to receipt of a first control signal.

In at least one embodiment, an electronic horn device is provided that includes a set of plural horn modules coupled to a mount that is configured to be disposed onboard a vehicle. Each of the horn modules includes plural compression drivers, and a horn body including a bell segment and plural branch segments fluidly connected to the bell segment. The compression drivers are respectively mounted to respective ends of the branch segments of the horn body. The electronic horn device includes one or more amplifiers operably connected to the compression drivers of the horn modules in the set, and a controller comprising one or more processors and operably connected to the one or more amplifiers. The controller is configured to control the one or more amplifiers to power the compression drivers of one or more of the horn modules to generate (i) a horn sound based on receipt of a first control signal, (ii) a bell sound based on receipt of a second control signal, and (iii) a combined horn and bell sound based on receipt of a third control signal or receipt of both the first and second control signals within a designated period of time. The horn sound, the bell sound, and the combined horn and bell sound are emitted from the bell segment of the respective horn body.

In at least one embodiment, a locomotive horn device is provided that includes a first horn module configured to be mounted onboard a locomotive. The first horn module includes plural compression drivers and a horn body including a bell segment and plural branch segments fluidly connected to the bell segment. The compression drivers are respectively mounted to respective ends of the branch segments of the horn body. The locomotive horn device includes one or more amplifiers operably connected to the compression drivers of the first horn module, and a controller comprising one or more processors and operably connected to the first horn module via the one or more amplifiers. The controller is configured to control the compression drivers to generate a horn sound that is emitted from the bell segment of the horn body in response to receipt of a first control signal, and to control the compression drivers to generate a bell sound that is emitted from the bell segment in response to receipt of a second control signal.

BRIEF DESCRIPTION OF THE DRAWINGS

The inventive subject matter may be understood from reading the following description of non-limiting embodiments, with reference to the attached drawings, wherein below.

DETAILED DESCRIPTION

Figure 1:
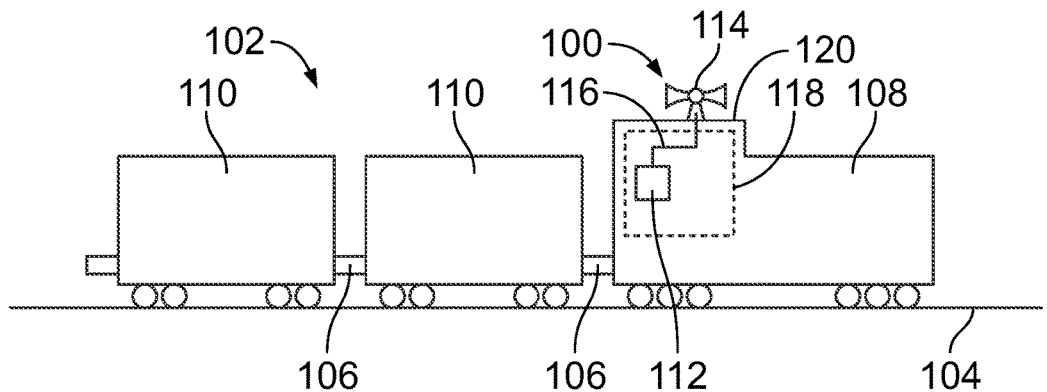
FIG. 1 illustrates an electronic horn device disposed onboard a vehicle system according to an embodiment.

Embodiments of the subject matter described herein relate to electronic horn devices and methods of operating the electronic horn devices to generate sounds, such as audible warnings. The electronic horn device operates by converting electrical energy to acoustic energy. The electrical energy may be supplied by a vehicle power circuit, a generator, a battery pack, or the like. The electrical to acoustic conversion may be performed by compression drivers that are coupled to horn bodies. For example, the compression drivers generate sound waves that are emitted into the horn bodies. In an embodiment, each horn body includes a single bell segment that defines the audio output end of the horn body, and the bell segment splits and diverges into multiple branch segments. Each of the branch segments is coupled to a different corresponding compression driver, such that the sound generated by multiple compression drivers is combined and aggregated within the horn body before being emitted from the output end.

The electronic horn device may not utilize compressed air, which beneficially reduces the load on air compressors onboard the vehicle, relative to conventional pneumatic air horns. Furthermore, the electronic horn device can be used to emit different types of sounds based on digital sound data files. The digital files may be stored in a memory device of the electronic horn device. An operator may select which sound of multiple different sounds for the electronic horn device to generate, and a controller of the horn device may then retrieve and utilize a digital file that is associated with the selected sound. This capability to generate different sounds enhances the functionality of the electronic horn device over conventional pneumatic horns, which are generally limited to a single horn sound. Furthermore, the electronic horn device may effectively replace several audio devices conventionally disposed onboard a vehicle, such as the pneumatic horn, a bell, a megaphone, and/or the like, because those sounds and/or functions can be performed by the single electronic horn device. A reduction in the number of devices and components onboard the vehicle may beneficially reduce costs and weight. Additional attributes of the electronic horn device that represent advancements over conventional pneumatic horns are described herein.

While one or more embodiments are described in connection with rail vehicles, not all embodiments are limited to rail vehicles. Unless expressly disclaimed or stated otherwise, the inventive subject matter described herein extends to other types of vehicles, such as automobiles, trucks (with or without trailers), buses, marine vessels, aircraft, mining vehicles, agricultural vehicles, or other off-highway vehicles. The vehicles described herein (rail vehicles or other vehicles that do not travel on rails or tracks) can be part of a single vehicle system or a vehicle system of multiple vehicles. With respect to multi-vehicle systems, the vehicles can be mechanically coupled with each other (e.g., by couplers), or logically coupled but not mechanically coupled. For example, vehicles may be logically but not mechanically coupled when the discrete vehicles communicate with each other to coordinate movements of the vehicles with each other so that the vehicles travel together (e.g., as a convoy).

FIG. 1 illustrates an electronic horn device 100 disposed onboard a vehicle system 102 according to an embodiment. The vehicle system is land-based and travels on a route 104. The vehicle system includes multiple vehicles mechanically coupled in a line to travel together along the route. Adjacent vehicles are connected via couplers 106. At least one of the vehicles is a propulsion-generating vehicle 108 capable of generating tractive effort for propelling the vehicle system along the route. The propulsion-generating vehicle includes a propulsion system, such as an engine, one or more traction motors, and/or the like. In the illustrated embodiment, two of the vehicles are non-propulsion-generating vehicles 110 that do not generate tractive effort, and are pushed and/or pulled by the propulsion-generating vehicle. The vehicle system optionally may be longer and include more vehicles than the three vehicles illustrated in FIG. 1. Alternatively, the vehicle system may only include the single propulsion-generating vehicle. In an alternative embodiment, at least some of the vehicles of the vehicle system are mechanically separate (e.g., spaced apart without any linkage or coupler tethering the vehicles together). Mechanically separate propulsion-generating vehicles may be communicatively connected to each other to travel with coordinated movements along the route based on wireless control signals (e.g., to travel as a convoy).

In an example, the vehicle system can be a railroad train, and the route is a track. The propulsion-generating vehicle may be a locomotive. In other examples, the vehicle system may be a road train formed by multiple trucks (e.g., highway semi-truck, mining truck, logging truck, or the like), trailers, automobiles, buses, and/or the like. The route may be a paved road, an off-road path, or the like. For example, the propulsion-generating vehicle may be a truck, and the non-propulsion-generating vehicles may be trailers. In still other examples, marine vessels, aircraft (e.g., unmanned aerial vehicles), and/or the like may represent the vehicle system.

The electronic horn device may be used to provide audible warnings to notify people and animals about the presence of the vehicle system. In the illustrated embodiment, the electronic horn device is installed onboard the propulsion-generating vehicle. The electronic horn device may include a control assembly 112 and an audio output assembly 114 which are electrically connected via a wired signal pathway 116. The control assembly may contain electronics components for powering and controlling the audio output assembly. The audio output assembly may include components for generating and emitting sounds that serve as the audible warnings.

The control assembly may be disposed within an interior of the propulsion-generating vehicle, and the audio output assembly may be disposed along an outside or exterior of the propulsion-generating vehicle. As such, the audio output assembly may be exposed to environmental conditions (e.g., sunlight, precipitation, hot and cold temperatures, etc.), while the control assembly is sheltered from the environmental conditions. For example, the control assembly may be mounted within a cab 118 of the vehicle, accessible to an operator within the cab. The audio output assembly may be mounted along an exterior surface 120 of the vehicle, such as a roof or hood of the vehicle. Locating the audio output assembly along the outside of the vehicle may increase the emission efficiency by reducing the likelihood of acoustic energy being absorbed and/or obstructed by components of the vehicle. In an alternative embodiment, the audio output assembly is mounted outside of the cab along an exterior of the vehicle.

Optionally, the control assembly may be electrically connected to an electrical power circuit onboard the vehicle system, which powers the electronic horn device. For example, the control assembly may include a power cable that plugs into an electrical outlet or circuit box onboard the propulsion-generating vehicle. The audio output assembly may receive audio output power via the wired pathway that connects the audio output assembly to the control assembly. In an alternative embodiment, the control assembly may be powered by a power source that is independent of the vehicle system electrical power circuit, such as a battery pack within the control assembly itself or a discrete battery pack, generator, or other power source that is onboard the vehicle.

Figure 2:
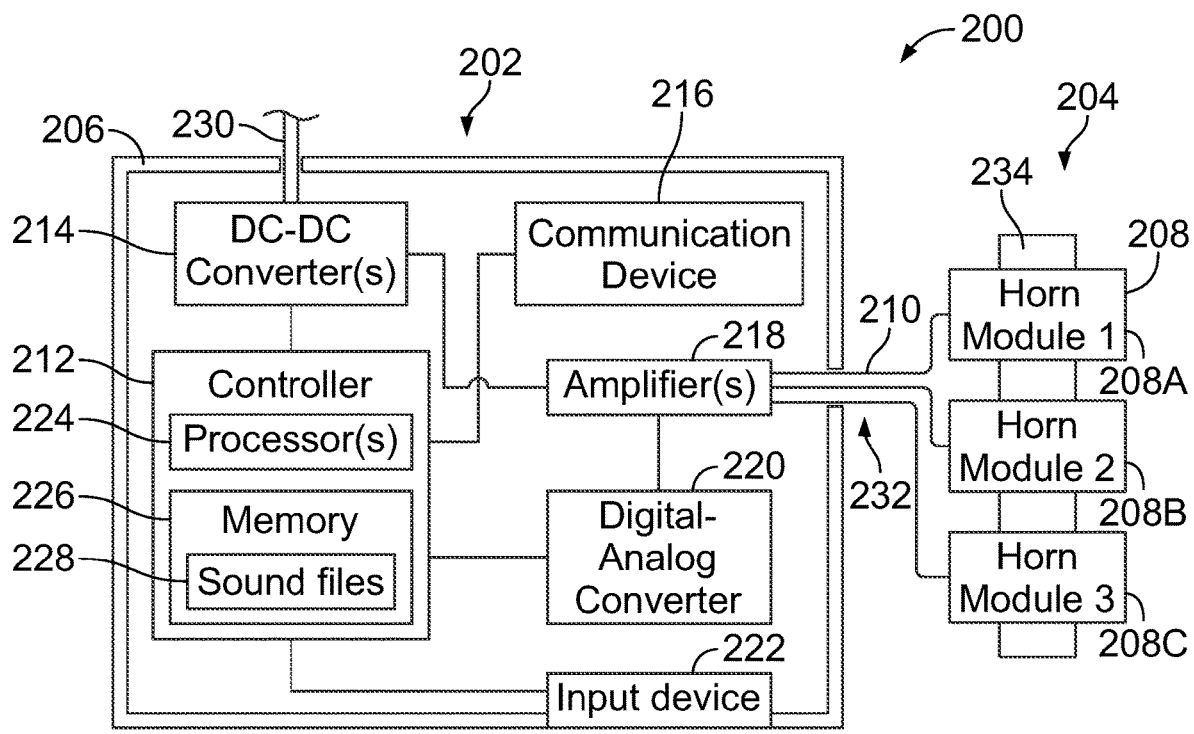
FIG. 2 is a schematic block diagram of an electronic horn device for providing audible warnings from a vehicle according to an embodiment.

FIG. 2 is a schematic block diagram of an electronic horn device 200 for providing audible warnings from a vehicle according to an embodiment. The electronic horn device may be designed for installation onboard a vehicle. For example, the electronic horn device may represent the electronic horn device shown in FIG. 1. In an alternative embodiment, the electronic horn device may be located offboard a vehicle.

The electronic horn device may include a control assembly 202 and an audio output assembly 204. In the illustrated embodiment, the control assembly 202 includes multiple control electronics devices and circuitry disposed within a housing 206 (e.g., a controller housing). The audio output assembly includes one or more horn modules 208. Three horn modules 208A, 208B, 208C are shown in the illustrated embodiment, but the audio output assembly may include only one horn module, only two horn modules, or more than three horn modules in other embodiments. The audio output assembly is spaced apart from the control assembly and connected via one or more wires 210. At least some of the wires are electrically conductive to convey electric current for powering the horn modules. As described above with respect to FIG. 1, the housing of the control assembly may be mounted within a vehicle, such as in a cab, and the audio output assembly may be mounted along an exterior surface of the vehicle, with the wires extending between and connecting the control assembly to the audio output assembly. Alternatively, the housing of the control assembly may be mounted outside of the cab along an exterior of the vehicle.

The control assembly may include a controller 212, one or more DC-to-DC converters 214, a communication device 216, one or more amplifiers 218, a digital-to-analog converter 220, and an input device 222. The control assembly optionally may include additional components not shown in FIG. 2, such as a display or other output device. The components of the control assembly may be held within or attached to the housing. The controller is operably connected to the other components of the control assembly via wired and/or wireless communication pathways. By "operably connected," it is meant that two or more devices, systems, subsystems, assemblies, modules, components, and the like, are joined by one or more wired or wireless communication links, such as by one or more conductive (e.g., copper) wires, cables, or buses; wireless networks; fiber optic cables; or the like. The controller may be a control circuit.

The controller may perform at least some of the operations described herein to generate various warning sounds. The controller represents hardware circuitry that includes and/or is connected with one or more processors 224 (e.g., one or more microprocessors, integrated circuits, microcontrollers, field programmable gate arrays, etc.). The controller includes and/or is connected with a tangible and non-transitory computer-readable storage medium (e.g., memory device) 226. The memory device may store programmed instructions (e.g., software) that is executed by the one or more processors to perform the operations of the controller described herein. The memory may store additional information, such as digital sound files (e.g., data files) 228, a calendar, a map or route database, and/or the like. The controller optionally may include a real time clock that the controller can utilize to track the time of year and time of day for various operations described herein. The clock may be battery backed-up to retain the time in the event of an electrical power outage.

The one or more DC-to-DC converters receive DC voltage from a power cable that extends from the housing. The power cable may connect to an electrical power circuit integrated onboard the vehicle, or alternatively to a portable power source that is discrete from the vehicle power circuit. The DC-to-DC converters may step up or down the voltage that is received at the input to be able to accommodate a broad range of input voltages. For example, the DC-to-DC converters may convert an input voltage that is within a broad range of between 14 V to 160 V to a designated power that is consumed by the amplifiers and the audio output assembly to generate sounds. The designated power may be a value that is determined based on the controller, amplifiers, and/or communication devices. The power may be 3.3 V or greater in magnitude (e.g., can be positive and/or negative). Optionally, the power may be within the range between 24 V and 110 V, such as at or around 74 V. In an embodiment, some of the power output from the DC-to-DC converters may be consumed by the controller, the communication device, and the input device, and a majority of the output power is conveyed to the one or more amplifiers that power the horn modules of the audio output assembly.

The communication device represents hardware circuitry that can communicate electrical signals with other devices, such as sensors onboard the vehicle and/or communication devices onboard other vehicles. The communication device can represent transceiving circuitry, one or more antennas, and the like. The transceiving circuitry may include a transceiver, or a separate transmitter and receiver. The electrical signals can form data packets that in the aggregate represent messages. In an example, the communication device may receive location data generated by a location-determining device disposed onboard the vehicle. The location data represents a location of the vehicle. The communication device may forward the location data that is received to the controller for analysis. In addition to receiving messages (e.g., control signals, sensor data, etc.), the communication device may also be utilized to transmit or broadcast messages that are generated by the controller. Optionally, the housing of the control assembly may include one or more input ports for hardwiring an end device to the housing, such as a sensor, a network router, a modem, and/or the like.

The input device of the control assembly may be mounted on the housing and accessible to an operator. The input device may include user input elements, such as push buttons, toggles, touchscreens, switches, and/or the like. An operator onboard the vehicle may be able to use the input device to interact with and control the electronic horn device. For example, an operator may use the input device to trigger the electronic horn device to emit a horn sound. The input device may enable additional selections, such as a selection of which of multiple different sounds to emit, a volume level selection, and/or the like. Optionally, the input device may include a microphone or other audio input device that enables an operator to provide spoken inputs. In an embodiment, the electronic horn device may have a public address mode (e.g., megaphone mode) that receives speech inputs from an operator and amplifies and projects the speech from the audio output assembly.

In an embodiment, the memory device of the control assembly stores multiple sound data files 228 associated with different sounds. The sound data files may be digital files. The sound data files may include a first data file that is associated with a horn sound, and a second data file that is associated with a bell sound. For example, the controller may retrieve and/or access the first data file from the memory to control the audio output assembly to generate a horn sound. The horn sound may be a traditional horn sound that is similar to the sound that pneumatic (e.g., air) horns make when activated. The controller may retrieve and/or access the second data file to control the audio output assembly to generate a bell sound. The bell sound may resemble the sound of a ringing bell. The files may include a third data file that is associated with a combined horn and bell sound. For example, when the controller uses the third data file, the audio output assembly may be controlled to concurrently emit both the bell sound and the horn sound. The memory may store any number of sound data files that represent any type of sound. For example, the memory may include a data file that is associated with a barking dog sound, which the controller may utilize as the vehicle approaches livestock on the route to motivate the livestock to move off the route. The memory may also store data files associated with different spoken messages.

The digital-to-analog device may convert the digital sound files to analog signals. The digital-to-analog device is operably connected to the one or more amplifiers. The one or more amplifiers power the horn modules of the audio output device. For example, the one or more amplifiers may convey an amplified analog electrical signal representing a selected sound (e.g., horn, bell, combined horn and bell, etc.) to one or more of the horn modules. The amplifiers may include multiple driver channels, where each driver channel is used to control and power a different compression driver of the horn modules, as described with reference to FIGS. 3 and 4. The control assembly may include a single amplifier that has a sufficient number of driver channels to power and control all of the compression drivers of the horn modules. Alternatively, the control assembly may include multiple amplifiers that each have one or more driver channels. The one or more amplifiers may be powered by the one or more DC-to-DC converters. The one or more amplifiers may be connected to the electrical wires, which emerge from the housing as a cable 232. The cable extends from the housing to the horn modules of the audio output assembly. The electrical wires may be speaker wires, coaxial cables, or the like.

The audio output assembly includes a set of the plural horn modules coupled to a mount 234. The mount may be designed to be affixed along the exterior of the vehicle. The mount is a structural component, such as a bracket, rack, shelf, frame, or the like. In an embodiment, the horn modules are individually coupled to the mount, via fasteners and/or adhesive, and the mount is secured to the vehicle such that the mount is disposed between the horn modules and the vehicle. Each horn module may have the same or similar components, such that the horn modules may be copies or replicas of one another. For example, each horn module may include plural compression drivers and a horn body.

Figure 3:
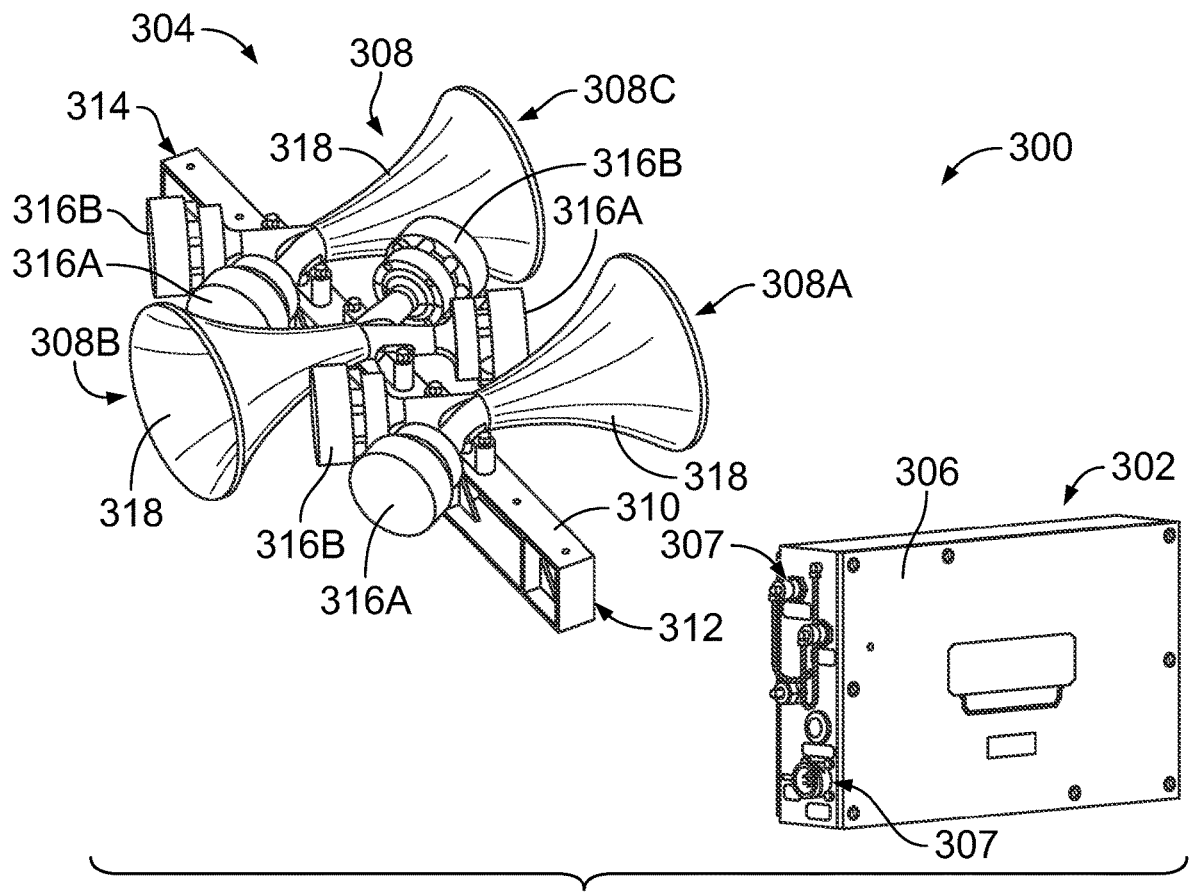
FIG. 3 is a perspective view of an electronic horn device according to an embodiment.

FIG. 3 is a perspective view of an electronic horn device 300 according to an embodiment. The electronic horn device may be the electronic horn device shown in FIG. 2. For example, the electronic horn device includes a control assembly 302 and an audio output assembly 304, which may represent the control assembly and audio output assembly, respectively, shown in FIG. 2. The control assembly includes a housing or enclosure 306. The housing may include ports 307 along at least one wall for accommodating connectors, operator input devices (e.g., buttons, toggles, switches, etc.), operator output devices (e.g., lights, display screen, etc.), and the like. The audio output assembly includes multiple horn modules 308 individually affixed to a mount 310. The horn modules include a first horn module 308A, a second horn module 308B, and a third horn module 308C, which are spaced apart along a length of the mount. The length of the mount extends from a first end 312 of the mount to a second end 314 of the mount, opposite the first end. Each of the horn modules includes two compression drivers 316A, 316B and a horn body 318. The one or more wires or cables that extend between and connect the control assembly to the audio output assembly are not shown in FIG. 3.

Figure 4:
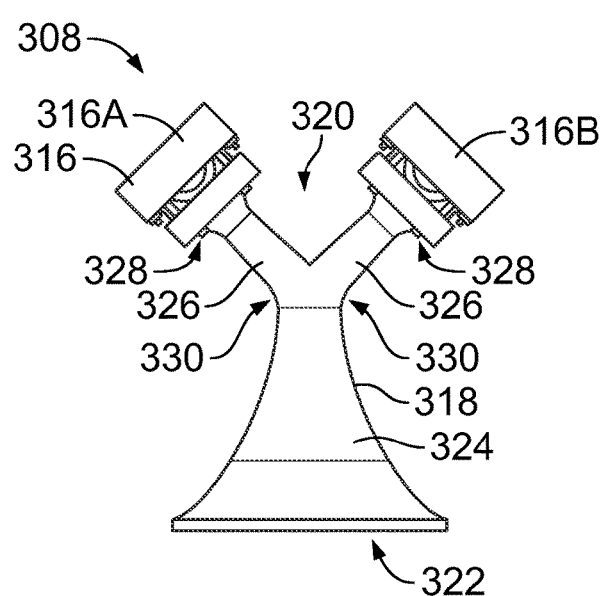
FIG. 4 is a plan view of one horn module of the electronic horn device shown in FIG. 3.

FIG. 4 is a plan view of one of the horn modules 308 of the electronic horn device shown in FIG. 3. The horn body 318 of the horn module extends from an input end 320 and an output end 322. The horn module emits the sounds from the output end of the horn body. The horn body includes a bell segment 324 and plural branch segments 326. The branch segments and the bell segment are hollow, and the branch segments are fluidly connected to the bell segment. The branch segments converge to connect to the bell segment. In an embodiment, the horn body is a unitary, monolithic structure such that the branch segments are seamlessly connected to the bell segment. The horn body may be formed via a molding process, a welding process, or the like. Each of the branch segments includes a respective proximal end 328 and a distal end 330. The proximal ends of the branch segments may define the input end of the horn body. The distal ends of the branch segments merge and connect to the bell segment. The bell segment extends from the branch segments to the output end of the horn body. As such, the bell segment defines the output end. The bell segment may have a generally conical shape that broadens with increasing proximity to the output end. The branch segments may have generally cylindrical shapes.

The compression drivers 316 are mounted to the proximal ends of the branch segments. Each compression driver is mounted to the proximal end of a different one of the branch segments. For example, a housing of each compression driver may be mechanically secured via fasteners and/or adhesive to the proximal end of one branch segment. In the illustrated embodiment, the horn module includes two compression drivers 316A, 316B, and the horn body has two branch segments. In an alternative embodiment, the horn module may include three or more compression drivers, and the horn body may include three or more branch segments that converge to connect to the bell segment.

The compression drivers may be operably connected to one or more amplifiers of the control assembly of the electronic horn device, such as the one or more amplifiers shown in FIG. 2. The compression drivers may be electrically connected to the one or more amplifiers via one or more wires. The one or more amplifiers may power the compression drivers by supplying electric current in the form of amplified drive signals to the compression drivers. The compression drivers may convert the electrical energy of the drive signals to acoustic energy that is output in audible form into the respective branch segment to which the compression driver is secured. The shape of the horn body may amplify the sound level provided by the compression driver, such that the sound level emitted from the output end of the bell segment is greater than the sound level that enters the branch segment.

Furthermore, in an embodiment, both compression drivers may be concurrently powered to produce sound waves. For example, the controller of the control assembly may synchronize the first and second compression drivers of the same horn module to generate the same sound. The acoustic energy from the first compression driver that enters one of the branch segments may combine within the bell segment with the acoustic energy from the second compression driver that enters the other branch segment. As a result, the sound that is emitted from the output end of the bell segment, when both compression drivers are synchronized, is at a greater output sound level (e.g., sound intensity or volume) than if the sound is generated by only one of the compression drivers or if the sound is generated by multiple compression drivers that are not synchronized.

Referring now back to FIG. 3, the horn modules optionally may have different orientations relative to the mount to direct the sound that is emitted from the bell segments in different directions. In the illustrated embodiment, the horn body of the second (e.g., middle) horn module has a reverse orientation of the horn bodies of the first and third horn modules. When installed on the vehicle, some of the horn modules may direct sound towards the front of the vehicle, and other horn modules on the same mount may direct sound towards the rear of the vehicle. For example, the first and third horn modules emit sound in the forward direction, relative to the front-to-back orientation of the vehicle and/or direction of travel of the vehicle, while the second horn module emits sound in the rearward direction. The horn bodies of all three horn modules may be in a parallel arrangement, such that center axes of the horn bodies from the input to the output ends are parallel. The orientations may alternate such that the compression drivers of the second (e.g., middle) horn module are disposed between the bell segments of the first and third horn modules, and the bell segment of the second horn module is disposed between the compression drivers of the first and third horn modules. In an alternative embodiment, the horn modules may have a different orientation relative to one another, to the mount, and/or to the vehicle. For example, the horn bodies of the horn modules may be non-parallel, and each of the horn modules may be oriented to emit sound in a different direction from the other two horn modules. Optionally, some of the horn modules may direct sound towards a first side of the vehicle, and other horn modules on the same mount may direct sound towards the opposite, second side of the vehicle. In an alternative embodiment, the horn modules may be independently mounted to the vehicle, such that the horn modules are not coupled to a shared mount. The horn modules may be separately mounted to the vehicle in different orientations relative to the vehicle to emit sound in different directions for notifying observers at different locations relative to the vehicle.

The following description of the operation of the electronic horn device is made with reference to the electronic horn device shown in FIG. 2. The electronic horn device may generate and emit a sound in response to receipt of a control signal. The control signal may be received from one of multiple different sources. One source of the control signal may be the input device. For example, an operator onboard the vehicle may utilize the input device to select a sound and to initiate the generation of the sound by pressing a button, switch, toggle, graphic button on a touchscreen, and/or the like. Another suitable source may be an external device that is communicatively connected to the control assembly via the communication device. For example, an operator may use an application on a smartphone, tablet, wearable computer, or the like, to communicate a wireless message that includes the control signal. In another example, the control signal may be received from another computer device, such as a vehicle controller that is integrated into the vehicle. For example, the vehicle controller may monitor the proximity of the vehicle to a crossing based on location data and a route map or database, and in response to the vehicle controller determining that the vehicle is at or within a certain designated distance from the crossing, the vehicle controller may generate the control signal that instructs the electronic horn device to emit the horn sound.

In an embodiment, the control signal may identify a specific sound for the electronic horn device to generate and emit. For example, the memory device of the controller may include multiple digital sound files associated with different sounds. The sound files may include the horn sound, the bell sound, the combined horn and bell sound, a dog barking sound, one or more public address statements, and/or the like. The sound files are not limited to the examples provided. The memory device may store any digital sound file that satisfies certain data size limits and is uploaded onto the memory device. Optionally, digital sound files may be uploaded via an ethernet cable that is plugged into an input port on the control assembly.

In response to receiving the control signal, the one or more processors of the controller may analyze the control signal to determine which sound is requested, and then may access the memory to retrieve the digital data file that is associated with the requested sound. For example, if the control signal is a first control signal that selects the horn sound, then the controller retrieves a first digital data file associated with the horn sound. If the control signal is a second control signal that selects the bell sound, the controller retrieves a second digital data file associated with the bell sound. In response to receiving both the first control signal (for the horn) and the second control signal (for the bell) within a designated period of time (e.g., 1 or 2 seconds) of each other, then the controller may retrieve a third digital data file associated with the combination horn and bell sound. For example, an operator may utilize the input device to select a first button associated with the horn sound and to select a second button associated with the bell sound in quick succession. Optionally, instead of requiring both the first and second control signals, the input device may provide the operator the opportunity to directly select the combination horn and bell sound. For example, the operator may use the input device to generate a third control signal that is different from the first and second control signals. The operator may utilize the input device to select a third button specifically associated with the combination horn and bell sound. In response to receiving the third control signal, the controller retrieves the third digital data file.

The controller may convey the data file that is retrieved from the memory to the digital-to-analog converter that is operably connected to the one or more amplifiers. The digital-to-analog converter may convert the digital data to an analog signal. The one or more amplifiers may amplify the analog signal to formulate a drive signal. The one or more amplifiers may communicate the drive signal to the compression drivers of one or more of the horn modules via the electrical wires. The compression drivers that receive the drive signal convert the electrical energy to acoustic energy and emit sound waves into the horn body. The sounds emitted from the horn bodies of the horn modules have the characteristic sound properties of the selected sound, such as a horn sound, a bell sound, a combined horn and bell sound, and/or the like. The emitted sounds may notify and warn people and animals about the presence of the vehicle, enabling the people and animals to exit an area of the route before the vehicle reaches that area of the route.

Compared to a conventional pneumatic horn, the electronic horn device is capable of generating loud, reliable sounds that satisfy regulations without the drawback of consuming compressed air. For example, regulations may require warning sounds, such as the horn sound, to be emitted at a relatively high sound pressure level (e.g., volume). The electronic horn device achieves the designated sound pressure level due to the use of multiple compression drivers for each horn module and the construction of the horn body. The horn body is constructed and coupled to the compression drivers to collect and aggregate the sound waves generated by the compression drivers to produce a single output sound that is emitted from the bell segment. The controller and the one or more amplifiers may synchronize operation of the compression drivers to ensure that the combined output meets desired acoustic properties (e.g., has designated frequency, timing, volume or intensity, and the like). If each horn module only had a single compression driver, the electronic horn device may not be able to satisfy the required sound pressure level, or would only be able to meet the sound pressure level by consuming significantly more electrical energy than the electronic horn device according to the embodiments herein.

In an embodiment, the electronic horn device may individually control the different horn modules. For example, a different set of one or more electrical wires may connect the compression drivers of each horn module to at least one driver channel on the one or more amplifiers. A first set of wires may connect to the first horn module, a second set to the second horn module, and a third set to the third horn module. Optionally, the sets of wires may be bundled together along a majority of the distance from the control assembly to the audio output assembly.

The controller may select which of the horn modules to activate for generating each sound output. For example, upon approaching a grade crossing, the controller may control the two forward-facing horn modules (e.g., the first and third horn modules) in FIG. 3 to emit the horn sound without activating the rearward-facing horn module. As such, the horn sound is projected forward to notify people and animals that may be present at the upcoming grade crossing. In another example, if the vehicle is backing up, the controller may control the single rearward-facing horn module (e.g., the second horn module) to emit a sound to notify people and animals that the vehicle is backing up, such as a beeping sound, without activating the two forward-facing horn modules. In yet another example, the combined horn and bell sound optionally may be provided by the controller controlling a first subset of the horn modules to generate a horn sound and a second subset of the horn modules to generate a bell sound, such that the resulting output is both the horn and bell sounds.

For some sound applications, the controller may concurrently activate all of the horn modules, such as to provide maximum volume and/or to provide a general warning to anyone in the vicinity, not just to people in front or behind. Optionally, if not all horn modules are necessary to produce a desired sound output, the controller may cycle through the horn modules over time to extend the operational life of the collective horn modules. For example, the controller may control the first and second horn modules to produce a first sound output at a first time, may control the first and third horn modules to produce a second sound output at a second time, and may control the second and third horn modules to produce a third sound output at a third time. The horn module that is not used for each sound application is reserved as a backup.

In an embodiment, the controller may be capable of independently controlling the compression drivers of each horn module. For example, the first compression driver of each horn module may be connected via a first electrical wire to a first driver channel of the one or more amplifiers, and the second compression driver of the same horn module may be connected via a different, second electrical wire to a different, second driver channel of the one or more amplifiers. Independent control of the compression drivers enables certain applications, such as diagnostics, fault testing, cycling the use of the horn modules and/or compression drivers, and the like. For example, the controller may be able to detect a fault in one of the amplifier driver channels. In response, the controller may block power to the driver channel at fault. To generate a sound, the controller may adjust the power (e.g., voltage) supplied to the other compression driver of the horn module connected to the driver channel at fault and/or the power supplied to compression drivers of one or more other horn modules. For example, the controller may essentially deactivate both compression drivers of the horn module that is connected to the faulty driver channel, and may mitigate the loss of the horn module by increasing the power supplied to the compression drivers of some or all of the other horn modules, relative to the power that would have been supplied to those compression drivers absent the fault condition. The conventional pneumatic horns are not able to provide sufficient control over the acoustic components to enable diagnostics, fault testing, fault mitigation, and cycling techniques.

In an embodiment, the controller of the electronic horn device may control the sound pressure level (e.g., volume) of the output sound based on various conditions. One of the conditions may be the location of the vehicle relative to designated areas, such as areas designated as quiet zones. The controller of the electronic horn device may receive location data indicative of the location of the vehicle, and may compare that location data to a map or route database that identifies one or more noise restriction zones or areas. Noise restriction zones may be geographic areas that impose certain operating constraints, such as a limit on noise emitted by vehicles traveling through the areas. The limit may be a designated decibel value. The noise restriction zones may be delineated by geofences, which are geographic borders. Optionally, the noise restriction zones may not only be geographically limited, but also temporally limited such that the noise restrictions are only in effect during certain times, such as at night and the early morning. The location data may be generated by a location determining device onboard the vehicle. The location determining device may be a GPS receiver.

Upon receiving a control signal to generate a sound, the controller may check the location of the vehicle relative to any noise restriction zones. The controller may also check the time of day by referring to the real time clock or another timing device. In an alternative embodiment, the controller may inquire to another computing device, such as the onboard vehicle controller, about whether the vehicle is currently in a noise restriction area (rather than comparing the location to the route map or database itself). In response to the location data indicating that the vehicle is in a noise restriction zone, the controller may generate the selected sound at a first output sound level (e.g., a first volume or sound pressure level), where the first output sound level satisfies the constraint by not exceeding the threshold sound level. Conversely, when the location data indicates that the vehicle is outside of the noise restriction zone, the controller may generate the selected sound at a sound output sound level, which is greater (e.g., louder) than the first output sound level. For example, the second output sound level may exceed the upper limit associated with a noise restriction zone. The second output level may be within a range specified by a general regulation. The controller may automatically perform such a location check whenever a control signal is received. For example, even when an operator pushes a button to activate the electronic horn device, the controller may perform this location check prior to controlling the amplifiers to power the compression drivers.

Other conditions that may be used for selecting and/or modifying the step change in volume output may include the time of year, weather conditions, and the like. Thus, the controller may automatically control and vary the volume of the output sound according to various conditions, independent of operator volume selection.

Optionally, the compression drivers may include heating elements on or within the individual compression driver housings to regulate the temperature of the compression drivers to ensure consistent, reliable sound generation. For example, the heating elements may provide heat in cold ambient temperatures to avoid temperature-based performance degradation.

The electronic horn device may automatically record and log events that occur. The controller may track activity such as the type of sounds generated, the number of sounds generated, time stamps of the sounds, and properties of the sounds (e.g., volumes). The data collected can be analyzed over time determine when to replace and/or perform maintenance on the components of the electronic horn device. The controller may also use an output device of the control assembly and/or the communication device to notify an operator about a detected fault and other detected events. For example, the controller may generate a notification message that is displayed on a display device and/or transmitted to an external device, such as a smartphone or wearable computer device.

Figure 5:
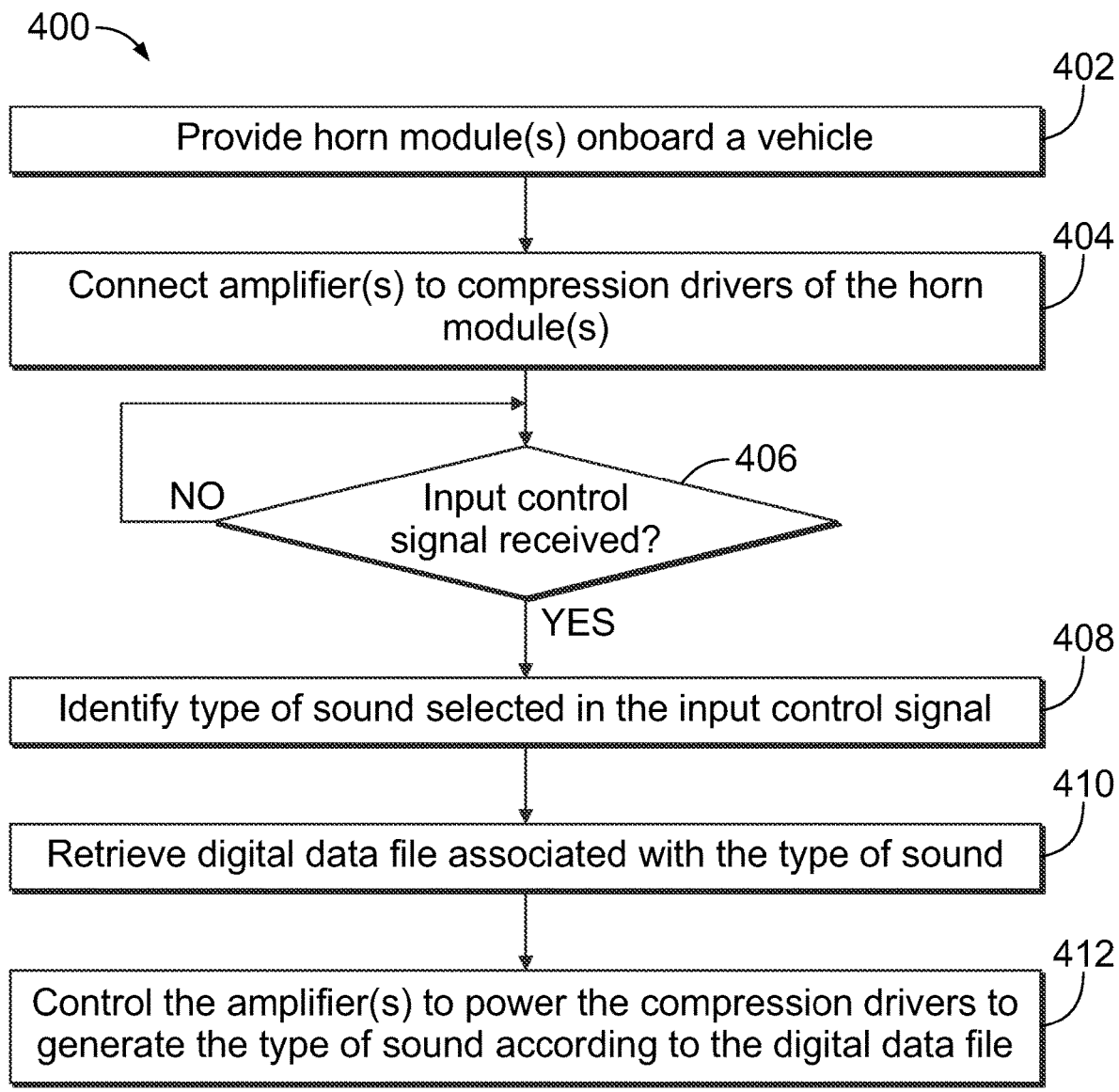
FIG. 5 is a method for emitting a warning sound from an electronic horn device of a vehicle according to an embodiment.

FIG. 5 is a method 400 for emitting a warning sound from an electronic horn device of a vehicle according to an embodiment. In one example, the method may be performed by the electronic horn device shown in FIG. 2. One or more of the steps of the method may be performed by the controller of the electronic horn device. The method optionally may include more steps than shown, fewer steps than shown, and/or different steps than shown in FIG. 5.

At step 402, one or more horn modules are provided onboard a vehicle. The vehicle may be a rail vehicle, such as a locomotive. Alternatively, the vehicle may be an automobile, a truck, a bus, a marine vessel, an aircraft, or another type of vehicle. In an embodiment, multiple horn modules are provided and coupled to a common mount structure. The horn modules may be replicas or copies of each other. For example, each horn module includes plural compression drivers and a horn body. The horn body includes a bell segment and plural branch segments fluidly connected to the bell segment. Each of the compression drivers is mounted to a respective end of a different one of the branch segments of the horn body. In an embodiment, the horn modules are mounted on an exterior surface of the vehicle, such that the horn modules are exposed to the environmental conditions. The vehicle optionally may be a locomotive.

At step 404, one or more amplifiers of a control assembly are connected to the compression drivers of each horn module via electrical wires. For example, a first set of electrical wires may connect the amplifiers to the compression drivers of a first horn module, and a second set of electrical wires may connect the amplifiers to the compression drivers of a second horn module. In an embodiment, the control assembly includes a housing that is discrete and spaced apart from the one or more horn modules. For example, the housing may be installed within a cab of the vehicle (e.g., the locomotive).

At step 406, it is determined whether a control signal is received. The control signal may be received from an input device of the control assembly within the vehicle, a wireless message received by a communication device of the control assembly, an onboard vehicle controller, or the like. The control signal may be a command for the electronic horn device to generate a specific type of sound.

If no control signal is received, no additional action is taken, and the method continues to monitor for receipt of a control signal. On the other hand, if it is determined that a control signal is received, then flow continues to step 408. At step 408, a type of the sound selected in the control signal is identified by analyzing the control signal. The type of sound may be a horn sound, a bell sound, a combined horn and bell sound, or the like. At step 410, a digital data file (e.g., sound file) associated with the type of sound selected in the control signal is retrieved from a memory device. For example, if the selected sound is a horn, the controller (e.g., one or more processors) may retrieve a digital data file that is associated with the horn sound. The digital data file may include instructions for generating the horn sound. If the bell sound is selected, a different, second data file, which is associated with the bell sound, is retrieved from the memory device.

At step 412, the one or more amplifiers are controlled to power the compression drivers of one or more of the horn modules to generate the selected sound according to the digital data file. For example, the digital data file may be conveyed to a digital-to-analog converter that generates an analog electrical signal based on the digital data from the file. The analog signal may then be amplified by the one or more amplifiers to form a drive signal that is conveyed via the electrical wires to at least some of the horn modules. The compression drivers that receive the drive signal convert the electrical energy of the drive signal to acoustic energy that is supplied into the respective horn body. The sound emitted from multiple compression drivers may be aggregated in each horn body and then emitted from the bell segment to provide an amplified output sound. The output sound may warn and notify people and animals that the vehicle is present and approaching.

Figure 6:
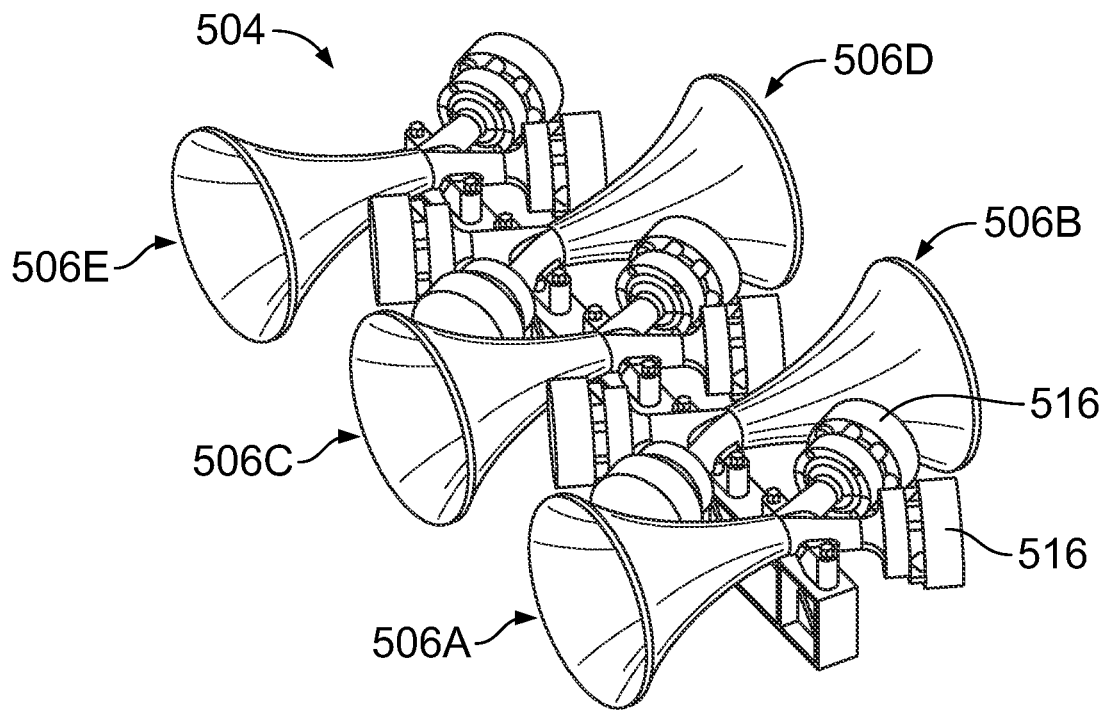
FIG. 6 is a perspective view of an audio output assembly of an electronic horn device according to another embodiment.

FIG. 6 is a perspective view of an audio output assembly 504 of an electronic horn device according to another embodiment. The audio output assembly in FIG. 6 may be the audio output assembly shown in FIG. 2, and may be used in place of the audio output assembly shown in FIG. 3. For example, the audio output assembly in FIG. 6 may connect via one or more wires to the control assembly shown in FIG. 3. The audio output assembly in FIG. 6 includes five horn modules 508A-E. The horn modules may have the same construction as the horn modules in FIGS. 3 and 4. For example, each of the compression drivers 516 of the horn modules may be electrically connected to the one or more amplifiers of the control assembly. FIG. 6 indicates that the audio output assembly may have different numbers of horn modules, ranging from as low as one horn module to five or more horn modules.

Figure 7:
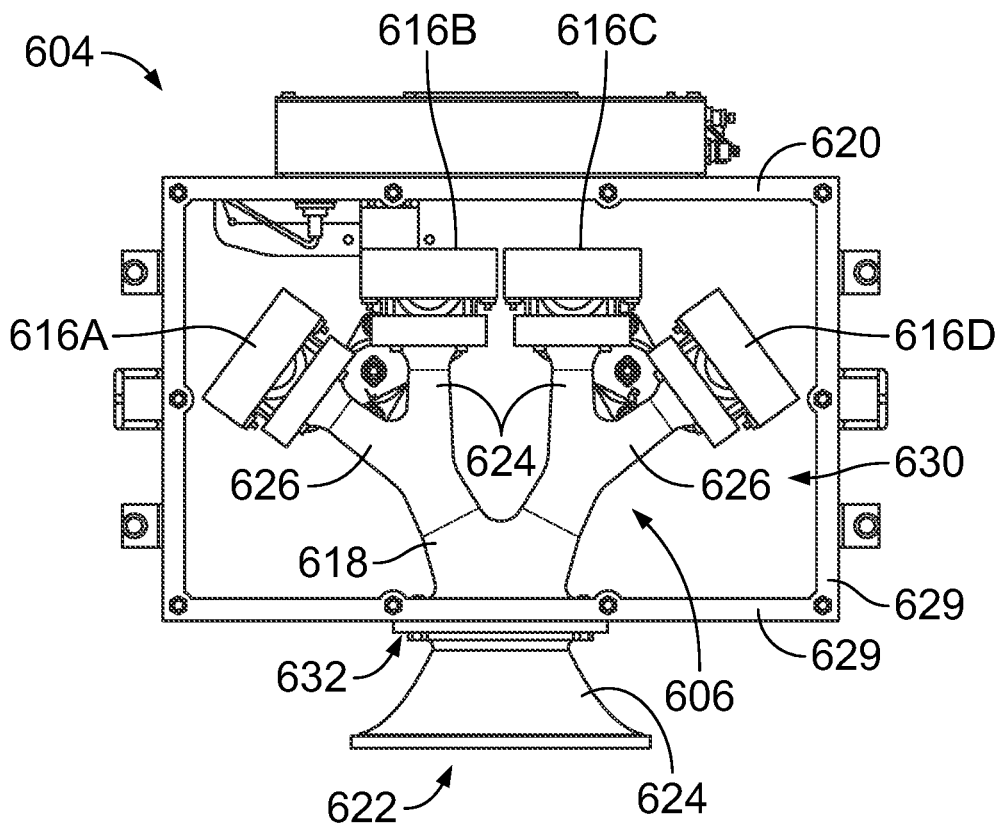
FIG. 7 is a plan view of an audio output assembly of an electronic horn device according to another embodiment.

FIG. 7 is a plan view of an audio output assembly 604 of an electronic horn device according to yet another embodiment. The audio output assembly in FIG. 7 may be the audio output assembly shown in FIG. 2. The audio output assembly includes a horn module 606 and an enclosure 620. The horn module has a horn body 618 and four compression drivers 616A-616D. The horn body includes a bell segment 624 and four branch segments 626 that diverge from the bell segment. The compression drivers are coupled to corresponding branch segments. The sound waves generated by the compression drivers converge within the horn body and are emitted from the bell segment as a combined output sound. The four compression drivers may be powered by the one or more amplifiers of the control assembly shown in FIG. 2. The enclosure has multiple walls 629 that define a cavity 630. The bell segment of the horn body protrudes through an opening 632 in one of the walls, such that an output end 622 of the bell segment is exterior of the enclosure. The sound is generated within the cavity, and is emitted from the output end of the bell segment outside of the enclosure.

The electronic horn device according to the embodiments disclosed herein operates without the use of compressed air, which reduces the load on air compressors onboard the vehicle. The electronic horn device can be used to emit different types of sounds, which conventionally required different audio devices. For example, the single electronic horn device may be operated to selectively emit horn sounds and bell sounds, so there is no need for both a horn device and a bell device. As a result, the vehicle can reduce the number of components onboard, which may reduce costs and weight. The electronic horn device may reliably control the characteristics of the sound that is output to satisfy certain regulations and restrictions, even in relatively harsh environmental conditions. Finally, the controller of the electronic horn device may implement various control techniques, such as automatically modulating the output volume based on geographic location of the vehicle, performing diagnostic tests for fault detection, adjusting electrical energy supplied to different compression drivers and/or horn modules in response to detecting a fault, and automatic recording of horn device activity. Conventional pneumatic horns do not have the capability to perform these "smart" functions.

In one or more example embodiments, an electronic horn device is provided that includes a horn module, one or more amplifiers, and a controller including one or more processors and operably connected to the horn module via the one or more amplifiers. The horn module is configured to be mounted onboard a vehicle. The horn module includes plural compression drivers and a horn body. The horn body includes a bell segment and plural branch segments fluidly connected to the bell segment. Each of the compression drivers is mounted to a respective end of a different one of the branch segments of the horn body. The one or more amplifiers are operably connected to the compression drivers of the horn module. The controller is configured to control the compression drivers to generate a horn sound that is emitted from the bell segment of the horn body in response to receipt of a first control signal.

Optionally, the controller is configured to control the compression drivers to generate a bell sound that is emitted from the bell segment in response to receipt of a second control signal. The controller may be configured to control the compression drivers to generate a combined horn and bell sound that is emitted from the bell segment in response to receipt of a third control signal or receipt of both the first and second control signals within a designated period of time.

Optionally, the horn module is a first horn module, and the electronic horn device includes at least a second horn module. The second horn module includes plural compression drivers and a horn body including a bell segment and plural branch segments fluidly connected to the bell segment. Each of the compression drivers of the second horn module is mounted to a respective end of a different one of the branch segments of the horn body of the second horn module. Optionally, the horn body of the second horn module has a different orientation than the horn body of the first horn module, relative to the vehicle, to direct sound in a different direction than the first horn module.

Optionally, the horn module has two compression drivers, and the horn body has two branch segments that converge to connect to the bell segment. The controller may be configured to synchronize the compression drivers of the horn module to generate a same sound. The one or more amplifiers and the controller may be disposed within a housing that is discrete and spaced apart from the horn module. The horn module may be electrically connected to the one or more amplifiers via one or more wires. Optionally, the horn module is configured to be installed on an exterior surface of the vehicle, and the housing is configured to be disposed within a cab of the vehicle.

Optionally, the controller is operably connected to a memory device that stores at least a first data file associated with the horn sound, and the controller configured to retrieve the first data file from the memory device in response to receiving the first control signal. Optionally, the controller is configured to receive location data indicative of a location of the vehicle. The controller may be configured to control the horn module to generate the horn sound at a first output sound level when the location data indicates that the vehicle is in a noise restriction zone and to generate the horn sound at a second output sound level, which is greater than the first output sound level, when the location data indicates that the vehicle is outside of the noise restriction zone. Optionally, the electronic horn device may include an input device communicatively connected to the controller and configured to provide volume level selection to an operator utilizing the input device.

In one or more example embodiments, a method includes providing a horn module onboard a vehicle. The horn module includes plural compression drivers and a horn body. The horn body includes a bell segment and plural branch segments fluidly connected to the bell segment. Each of the compression drivers is mounted to a respective end of a different one of the branch segments of the horn body. The method includes connecting one or more amplifiers to the compression drivers of the horn module via electrical wires.

Optionally, the method also includes controlling the one or more amplifiers, via one or more processors, to power the compression drivers to generate a horn sound that is emitted from the bell segment of the horn body in response to receipt of a first control signal. Optionally, the method includes mounting the horn module on an exterior surface of the vehicle, and disposing the one or more amplifiers and the one or more processors within a housing that is spaced apart from the horn module. The vehicle may be a locomotive, and the method may include installing the housing within a cab of the locomotive. Optionally, the method includes controlling the compression drivers to generate a bell sound that is emitted from the bell segment in response to receipt of a second control signal, and controlling the compression drivers to generate a combined horn and bell sound that is emitted from the bell segment in response to receipt of either a third control signal or receipt of both the first and second control signals within a designated period of time.

Optionally, the horn module is a first horn module, and the method includes providing at least a second horn module onboard the vehicle, where the second horn module is a replica of the first horn module. The method may include connecting the one or more amplifiers to compression drivers of the second horn module via a second set of electrical wires. The one or more amplifiers may be controlled to concurrently power the compression drivers of the first horn module and the compression drivers of the second horn module. Optionally, responsive to the receipt of the first control signal, the method includes retrieving a first data file associated with the horn sound from a memory device and conveying the first data file to a digital-to-analog converter that is operably connected to the one or more amplifiers.

In one or more example embodiments, a method includes receiving a first control signal at one or more processors onboard a vehicle. Responsive to receipt of the first control signal, the method includes controlling one or more amplifiers to power plural compression drivers of a horn module onboard a vehicle. The horn module includes the plural compression drivers and a horn body. The horn body includes a bell segment and plural branch segments fluidly connected to the bell segment. The compression drivers are respectively mounted to respective ends of the branch segments of the horn body. With the plural compression drivers of the horn module as powered by the one or more amplifiers, the method includes generating a horn sound that is emitted from the bell segment of the horn body. The horn sound is generated by the plural compression drivers, which are powered by the one or more amplifiers.

Optionally, the method includes controlling the compression drivers to generate a bell sound that is emitted from the bell segment in response to receipt of a second control signal, and controlling the compression drivers to generate a combined horn and bell sound that is emitted from the bell segment in response to receipt of a third control signal, or receipt of both the first and second control signals within a designated period of time. Optionally, the vehicle is a locomotive, the horn sound is a locomotive horn sound, and the bell sound is a locomotive bell sound. Responsive to the receipt of the first control signal, the method may include retrieving a first data file associated with the horn sound from a memory device and conveying the first data file to a digital-to-analog converter that is operably connected to the one or more amplifiers.

In one or more example embodiments, an electronic horn device includes a set of plural horn modules coupled to a mount that is configured to be disposed onboard a vehicle. Each of the horn modules includes plural compression drivers, and a horn body including a bell segment and plural branch segments fluidly connected to the bell segment. The compression drivers are respectively mounted to respective ends of the branch segments of the horn body. The electronic horn device includes one or more amplifiers operably connected to the compression drivers of the horn modules in the set, and a controller comprising one or more processors and operably connected to the one or more amplifiers. The controller is configured to control the one or more amplifiers to power the compression drivers of one or more of the horn modules to generate (i) a horn sound based on receipt of a first control signal, (ii) a bell sound based on receipt of a second control signal, and (iii) a combined horn and bell sound based on receipt of a third control signal or receipt of both the first and second control signals within a designated period of time. The horn sound, the bell sound, and the combined horn and bell sound are emitted from the bell segment of the respective horn body.

Optionally, the horn body of a first horn module of the set has a different orientation, relative to the mount, than the horn body of a second horn module of the set to direct sound in a different direction than the second horn module. The one or more amplifiers and the controller may be disposed within a housing that is discrete and spaced apart from the set of the horn modules. The one or more amplifiers may be electrically connected to the set of the horn modules on the mount via wires.

In one or more example embodiments, a locomotive horn device is provided that includes a first horn module configured to be mounted onboard a locomotive. The first horn module includes plural compression drivers and a horn body including a bell segment and plural branch segments fluidly connected to the bell segment. The compression drivers are respectively mounted to respective ends of the branch segments of the horn body. The locomotive horn device includes one or more amplifiers operably connected to the compression drivers of the first horn module, and a controller comprising one or more processors and operably connected to the first horn module via the one or more amplifiers. The controller is configured to control the compression drivers to generate a horn sound that is emitted from the bell segment of the horn body in response to receipt of a first control signal, and to control the compression drivers to generate a bell sound that is emitted from the bell segment in response to receipt of a second control signal.

Optionally, the horn device is configured to generate the horn sound at a sound level from 96 dB(A) to 110 dB(A) at 100 feet forward of the locomotive in a direction of travel of the locomotive. Optionally, the controller is configured to control the compression drivers to generate a combined horn and bell sound that is emitted from the bell segment in response to receipt of a third control signal or receipt of both the first and second control signals within a designated period of time. Optionally, the horn device includes a second horn module which has plural compression drivers and a horn body including a bell segment and plural branch segments fluidly connected to the bell segment. The compression drivers of the second horn module are respectively mounted to respective ends of the branch segments of the horn body of the second horn module. The horn body of the second horn module has a different orientation than the horn body of the first horn module to direct sound in a different direction than the first horn module. Optionally, the first horn module has two compression drivers and the horn body has two branch segments that converge to connect to the bell segment.

In any of the embodiments herein, the horn device (e.g., the amplifier(s), compression device(s), and horn body) may be configured to generate the horn sound at a sound level of from 96 dB(A) to 110 dB(A) at 100 feet (approximately 30.5 meters) forward of the vehicle in its direction of travel. This reflects that the horn sound may be relatively loud to warn other vehicles, etc. at upcoming grade crossings, and that the components of the horn device may be correspondingly sized or otherwise configured to produce such relatively high sound levels.

In an embodiment, a horn system (e.g., for a locomotive or other vehicle) includes an electronic horn device (as set forth in any of the embodiments herein) and an air horn that operates (to generate a horn sound and/or bell sound) using compressed air. The electronic horn device and the air horn may be affixed to the same support platform, base, or other mount, with the mount being attachable to a vehicle. The air horn includes an air input that attaches to a compressed air supply. The horn system may include a controller (or controllers) that is configured to control the electronic horn device to emit a horn sound (e.g., the controller may be configured to generate control signals to control one or more amplifiers to power a compression driver(s), as set forth herein). The controller (or controllers) is also configured to control application of the compressed air to the air horn to pneumatically power the air horn to emit a horn sound. The horn system may include separate control circuits for controlling the air horn and the electronic horn device independently of one another. For example, the air horn may be provided as a backup to the electronic horn device, with the electronic horn device being using primarily, e.g., as the primary source of horn and/or bell sounds, to reduce compressed air consumption relative to only using the air horn. The air horn may only be used when the electronic horn device is not functional or misfunctioning, as determined by a sound sensor onboard the horn system and/or the vehicle. Optionally, the air horn may be used concurrently with the electronic horn device to supplement the sound emitted by the electronic horn device, such as to achieve a sound level that is beyond the capability of the electronic horn device alone.

In an embodiment, the mount (plus attached air horn and electronic horn device) may be configured as a "drop in" replacement for an existing "air horn only" device of a vehicle. For example, the mount may have the same or overlapping footprint as the existing air horn only device, and the air horn of the horn system may be configured for fluid attachment to an existing air supply of the vehicle. This may allow existing air horn only devices to be swapped out for replacement with the horn system that also includes both the electronic horn device and the air horn, with air horn portion of the replacement horn system providing a backup or alternative horn device, as mentioned.

In an embodiment, a horn system includes an electronic horn device (as set forth in any of the embodiments herein) and one or more sound sensors. The sound sensor(s) may be attached to the mount near the horn body, or separate from the mount/horn body on the vehicle. The sound sensor(s) are configured for electronic communication with the horn device controller, or with another controller such as a general vehicle controller. The electronic communication may be wireless or over one or more conductive wires. The sound sensor(s) are configured to detect sound, and to generate sensor signals responsive to detecting the sound. The sensor signals contain information about one or more characteristics of the detected sound, e.g., frequency and sound level. The horn system may be configured for the controller in communication with the sensor(s) to analyze the sensor signals received from the sound sensor(s), e.g., to compare the receive sensor signals to one or more designated criteria. The controller may generate one or more control signals responsive to the sensor signals as analyzed (e.g., the control signals are generated if the signals meet the one or more designated criteria).

The controller may be configured to periodically analyze the sensor signals (e.g., to sample the signals at a designated rate) when the vehicle is moving but the horn device is not activated to identify known 'background noise' (of the vehicle in operation). The controller uses the detected background noise to assess if the sound sensor (or sensors) is working as intended. For example, if background noise is detected within a designated time threshold when the vehicle is in operation, then the controller may be configured to assess that the sound sensor is working as intended. However, if no background noise is detected within the designated time threshold, then the controller may be configured to assess that the sound sensor is not working as intended. In the case of the latter, the controller may be configured to take one or more remedial operations in response to determining that the sound sensor is not working as intended. For example, the controller may generate a control signal to store a fault notice in memory, may generate an operator alert on an operator control or information interface, may generate a maintenance alert for communication to a remote facility, etc.

If, on the other hand, the sound sensor is determined to be working as intended based on the detection of background noise, the controller may be configured to analyze the sensor signals corresponding to a known time when the horn device is activated for generating a horn or bell or other sound. If the sensor signals include information indicative of the horn device emitting sound according to its operating configuration, the controller may generate a control signal(s) relating to the horn device operating normally. If the sensor signals lack information indicative of the horn device emitting sound according to its operating configuration, the controller may perform one or more programmed operations. For example, the controller may generate a control signal(s) to store a fault notice in memory, may generate an operator alert on an operator control or information interface, may generate a maintenance alert for communication to a remote facility, may activate an air horn or other alternate sound emitting device (for at least one future alert instead of the electronic horn device), may slow or stop the vehicle, may operate the vehicle more slowly when passing through or past designated areas or locations (e.g., grade crossings), relative to how the vehicle is operated when the horn device is operating as intended, may stop at a designated location (e.g., before a grade crossing) and then proceed, etc.

In some example embodiments, the device performs one or more processes described herein. In some example embodiments, the device performs these processes based on processor executing software instructions stored by a computer-readable medium, such as a memory and/or a storage component. A computer-readable medium (e.g., a non-transitory computer-readable medium) is defined herein as a non-transitory memory device. A memory device includes memory space located inside of a single physical storage device or memory space spread across multiple physical storage devices.

Software instructions may be read into a memory and/or a data storage component from another computer-readable medium or from another device via the communication interface. When executed, software instructions stored in a memory and/or a storage component cause the processor to perform one or more processes described herein. Additionally or alternatively, hardwired circuitry may be used in place of or in combination with software instructions to perform one or more processes described herein. Thus, embodiments described herein are not limited to any specific combination of hardware circuitry and software.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

In one embodiment, the controller of the electronic horn device may have a local data collection system deployed that may use machine learning to enable derivation-based learning outcomes. The controller may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions.

In examples, machine learning may include a plurality of other tasks based on an output of the machine learning system. In examples, the tasks may be machine learning problems such as classification, regression, clustering, density estimation, dimensionality reduction, anomaly detection, and the like. In examples, machine learning may include a plurality of mathematical and statistical techniques. In examples, the many types of machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used for vehicle performance and behavior analytics, and the like.

In one embodiment, the controller of the electronic horn device may include a policy engine that may apply one or more policies. These policies may be based at least in part on characteristics of a given item of equipment or environment. With respect to control policies, a neural network can receive input of a number of environmental and task-related parameters. These parameters may include an identification of a determined trip plan for a vehicle group, data from various sensors, and location and/or position data. The neural network can be trained to generate an output based on these inputs, with the output representing an action or sequence of actions that the vehicle group should take to accomplish the trip plan. During operation of one embodiment, a determination can occur by processing the inputs through the parameters of the neural network to generate a value at the output node designating that action as the desired action. This action may translate into a signal that causes the electronic horn device to operate, such as by emitting a horn and/or bell sound, determining whether the horn device is operating as intended based on sound sensor signals, and the like. This may be accomplished via back-propagation, feed forward processes, closed loop feedback, or open loop feedback. Alternatively, rather than using back propagation, the machine learning system of the controller may use evolution strategies techniques to tune various parameters of the artificial neural network. The maintenance system may use neural network architectures with functions that may not always be solvable using back-propagation, for example functions that are non-convex.

In one embodiment, the neural network has a set of parameters representing weights of its node connections. A number of copies of this network are generated and then different adjustments to the parameters are made, and simulations are done. Once the output from the various models is obtained, they may be evaluated on their performance using a determined success metric. The best model is selected, and the vehicle controller executes that plan to achieve the desired input data to mirror the predicted best outcome scenario. Additionally, the success metric may be a combination of the optimized outcomes, which may be weighed relative to each other.

Optionally, the controller of the electronic horn device may utilize machine learning, as described above, to analyze the sensor signals from the sound sensor(s) to detect if the horn device is operating as intended. For example, the sensor signals may be input to a neural network which is trained to determine whether the sensor signals satisfy one or more designated criteria, to determine whether the sensor signals represent background noise, to measure characteristics of the sound emitted from the horn device, and/or the like.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. An electronic horn device, comprising:
   a horn module configured to be mounted onboard a vehicle, the horn module comprising:
   a plurality of compression drivers; and
   a horn body including a bell segment and a plurality of branch segments fluidly connected to the bell segment, each of the plurality of compression drivers is respectively mounted to respective ends of each of the plurality of branch segments of the horn body;
   one or more amplifiers operably connected to the plurality of compression drivers of the horn module;
   a controller comprising one or more processors and operably connected to the horn module via the one or more amplifiers, the controller configured to control the plurality of compression drivers to generate a horn sound that is emitted from the bell segment of the horn body in response to receipt of a first control signal; and
   a DC-to-DC converter to source power to the electronic horn device.

2. The electronic horn device of claim 1, wherein the controller is configured to control the plurality of compression drivers to generate a bell sound that is emitted from the bell segment in response to a receipt of a second control signal.

3. The electronic horn device of claim 2, wherein the controller is configured to control the plurality of compression drivers to generate a combined horn and bell sound that is emitted from the bell segment in response to a receipt of a third control signal or a receipt of both the first and second control signals within a designated period of time.

4. The electronic horn device of claim 1, wherein the horn module is a first horn module, and the electronic horn device comprises at least a second horn module, the second horn module comprising a second plurality of compression drivers and a second horn body including a second bell segment and a second plurality of branch segments fluidly connected to the second bell segment, each of the second plurality of compression drivers of the second horn module respectively mounted to respective ends of the second plurality of branch segments of the second horn body of the second horn module.

5. The electronic horn device of claim 4, wherein the second horn body of the second horn module has a different orientation than the horn body of the first horn module, to direct sound in a different direction than the first horn module.

6. The electronic horn device of claim 1, wherein the horn module has two compression drivers and the horn body has two branch segments that converge to connect to the bell segment.

7. The electronic horn device of claim 1, wherein the controller is configured to synchronize the compression drivers of the horn module to generate a same sound.

8. The electronic horn device of claim 1, wherein the one or more amplifiers and the controller are disposed within a housing that is discrete and spaced apart from the horn module, the horn module electrically connected to the one or more amplifiers via one or more wires.

9. The electronic horn device of claim 8, wherein the horn module is configured to be installed on an exterior surface of the vehicle, and the housing is configured to be disposed within a cab of the vehicle.

10. The electronic horn device of claim 1, wherein the controller is operably connected to a memory device that stores at least a first data file associated with the horn sound, the controller configured to retrieve the first data file from the memory device in response to receiving the first control signal.

11. The electronic horn device of claim 1, wherein the controller is configured to receive location data indicative of a location of the vehicle, the controller configured to control the horn module to generate the horn sound at a first output sound level when the location data indicates that the vehicle is in a noise restriction zone and to generate the horn sound at a second output sound level, greater than the first output sound level, when the location data indicates that the vehicle is outside of the noise restriction zone.

12. The electronic horn device of claim 1, further comprising an input device communicatively connected to the controller, the input device configured to provide volume level selection to an operator utilizing the input device.

13. An electronic horn device, comprising:
   a set of a plurality of horn modules coupled to a mount that is configured to be disposed onboard a vehicle, each of the plurality of horn modules comprising:
   a plurality of compression drivers; and
   a horn body including a bell segment and a plurality of branch segments fluidly connected to the bell segment, each of the plurality of compression drivers respectively mounted to respective ends of the plurality of branch segments of the horn body;
   one or more amplifiers operably connected to the plurality of compression drivers of the plurality of horn modules of the set;
   a controller comprising one or more processors and operably connected to the one or more amplifiers, the controller configured to control the one or more amplifiers to power the plurality of compression drivers of one or more of the plurality of horn modules to generate (i) a horn sound based on receipt of a first control signal, (ii) a bell sound based on receipt of a second control signal, and (iii) a combined horn and bell sound based on receipt of a third control signal or receipt of both the first and second control signals within a designated period of time, wherein the horn sound, the bell sound, and the combined horn and bell sound are emitted from the bell segment of the respective horn body of each of the plurality of horn modules; and
   a DC-to-DC converter to source power to the electronic horn device.

14. The electronic horn device of claim 13, wherein the horn body of a first horn module of the plurality of horn modules has a different orientation, relative to the mount, than the horn body of a second horn module of the plurality of horn modules to direct sound in a different direction than the second horn module.

15. The electronic horn device of claim 13, wherein the one or more amplifiers and the controller are disposed within a housing that is discrete and spaced apart from the plurality of the horn modules, the one or more amplifiers electrically connected to the plurality of horn modules on the mount via wires.

16. A locomotive horn device, comprising:
   a first horn module configured to be mounted onboard a locomotive, the first horn module comprising:

a plurality of compression drivers; and a horn body including a bell segment and a plurality of branch segments fluidly connected to the bell segment, the each of the plurality of compression drivers respectively mounted to respective ends of the plurality of branch segments of the horn body;

one or more amplifiers operably connected to the plurality of compression drivers of the first horn module;

a controller comprising one or more processors and operably connected to the first horn module via the one or more amplifiers, the controller configured to control the plurality of compression drivers to generate a horn sound that is emitted from the bell segment of the horn body in response to receipt of a first control signal, and to control the plurality of compression drivers to generate a bell sound that is emitted from the bell segment in response to a receipt of a second control signal; and a DC-to-DC converter to source power to the locomotive horn device.

17. The locomotive horn device of claim 16, wherein the horn device is configured to generate the horn sound at a sound level from 96 dB(A) to 110 dB(A) at 100 feet forward of the locomotive in a direction of travel of the locomotive.

18. The locomotive horn device of claim 16, wherein the controller is configured to control the plurality of compression drivers to generate a combined horn and bell sound that is emitted from the bell segment in response to a receipt of a third control signal or a receipt of both the first and second control signals within a designated period of time.

19. The locomotive horn device of claim 16, further comprising a second horn module, the second horn module comprising a second plurality of compression drivers and a second horn body including a second bell segment and a second plurality of branch segments fluidly connected to the bell segment, each of the second plurality of compression drivers of the second horn module respectively mounted to respective ends of the second plurality of branch segments of the horn body of the second horn module, wherein the horn body of the second horn module has a different orientation than the horn body of the first horn module to direct sound in a different direction than the first horn module.

20. The locomotive horn device of claim 16, wherein the first horn module has two compression drivers and the horn body has two branch segments that converge to connect to the bell segment.

* * * * *